Fig. 3a $T_m = 9\ ELEMENTS$ $$\Sigma_{23} = \overset{\phantom{-}}{0} - \overset{\phantom{-}}{0} - \overset{+}{\underset{-}{2}} = \quad \text{OUTPUT OF INTEGRATOR 11'}$$

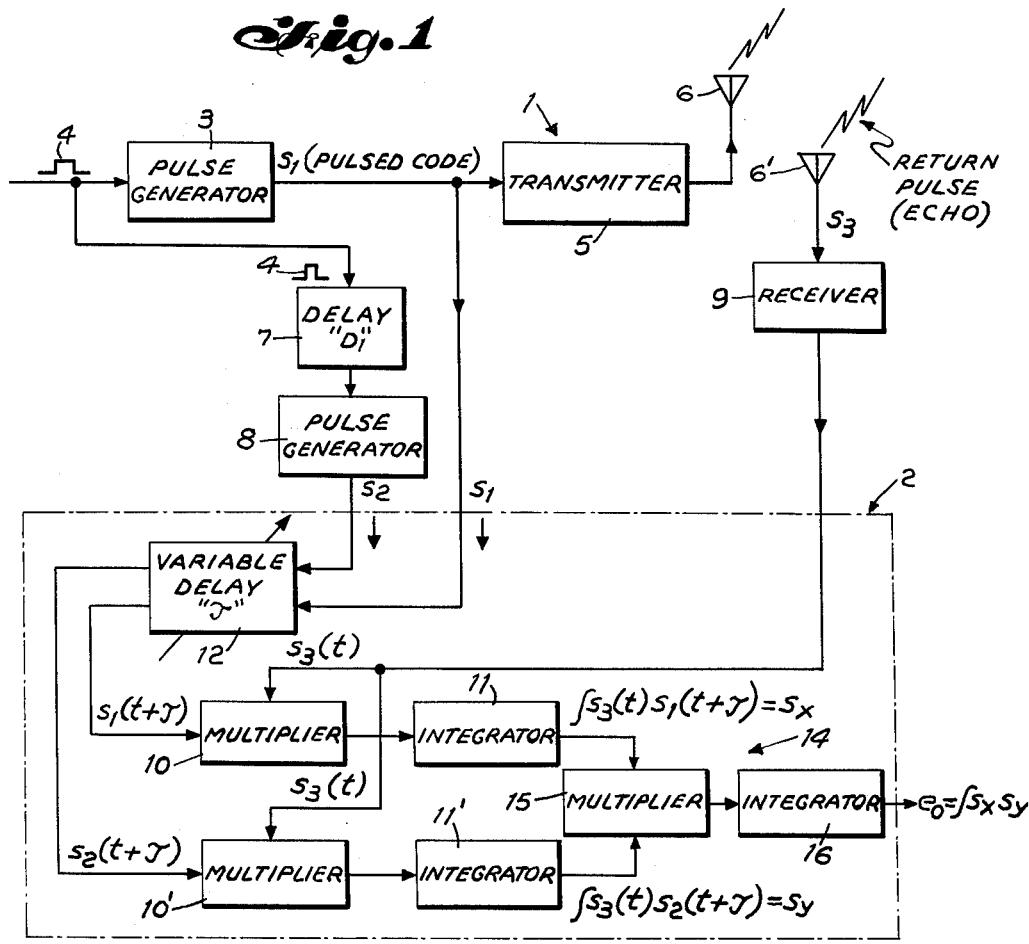

$S_2$ $\quad \mid\!\!\leftarrow\!\!-D_1\!\!\rightarrow\!\!\mid + - 0 + 2$ $S_3$ $\quad - + - 0 + - - + - - - - + + - 0 + 0 - -\qquad$ OUTPUT OF INTEGRATOR 16

$S_1$ $\quad \mid\!\!\leftarrow\!\!-T_m\!\!-\rightarrow\!\!\mid - + - 0 + - - + - - -$ $\Sigma_{13} = + - + 0 + + 0 + 0 + + =\quad 6\quad$ OUTPUT OF INTEGRATOR 11

Fig. 3b $T_m = 4\ ELEMENTS$ $$\Sigma_{23} = - + 0 + \overset{+}{\underset{-}{2}} 0 \overset{+}{\underset{+-}{2}} 0 0 \overset{+}{\underset{-}{3}} =\quad 8\quad \text{OUTPUT OF INTEGRATOR 11'}$$

$S_2$ $\quad \mid\!\!\leftarrow\!\!-D_1\!\!-\rightarrow\!\!\mid + - 0 + 2 + 2 4 0 3$ $S_3$ $\quad - + - 0 + - - + - - - - + + - 0 + 0 - -\qquad$ OUTPUT OF INTEGRATOR 16

$S_1$ $\quad \mid\!\!\leftarrow\!T_m\!\rightarrow\!\!\mid - + - 0 + - - + - - - - + + - 0$ $\Sigma_{13} = - - + 0 - + + - - - + 0 + 0 + 0 =\quad 0\quad$ OUTPUT OF INTEGRATOR 11

Fig. 3c $T_m = 0\ COINCIDENCE\ OF\ REFLECTED\ SIGNAL\ S_3\ AND\ CODED\ PULSE\ S_1$ $$\Sigma_{23} = \overset{\phantom{-}+\phantom{-}+-\phantom{--}-\phantom{--}-}{- - 0 - 2 - 2 4 0 0 3 0 8 0} =\quad 15\quad \text{OUTPUT OF INTEGRATOR 11'}$$

$S_2$ $\quad \mid\!\!\leftarrow\!D_1\!\rightarrow\!\!\mid + - 0 + 2 + 2 4 0 3 3 - 8 0\ 4\ 18\ 26$ $S_3$ $\quad - + - 0 + - - + - - - - + + - 0 + 0 - -\qquad$ OUTPUT OF INTEGRATOR 16 → K $S_1$ $\quad - + - 0 + - - + - - - - + + - 0 + 0 - -$ $\Sigma_{13} = + + + 0 + + + + + + + + + + + 0 + 0 + + =\quad 17\quad$ OUTPUT OF INTEGRATOR 11

INVENTORS.
FRANK S. GUTLEBER
BY ROBERT S. BAILEY

*Thomas J. Kilgannon Jr.*

AGENT

Sept. 21, 1965     F. S. GUTLEBER ETAL     3,208,065

IMPULSE CORRELATION FUNCTION GENERATOR

Filed July 24, 1963     5 Sheets-Sheet 3

INVENTORS.
FRANK S. GUTLEBER
BY ROBERT S. BAILY

AGENT

Fig. 4
*a*    $S_1$    $-\ +\ -\ \circ\ +\ \circ\ -\ -$
*b*    $S_2$    $-\ +\ -\ \circ\ +\ -\ -\ -\ \bar{2}\ +$
*c*    $Tm = 4$ ELEMENTS
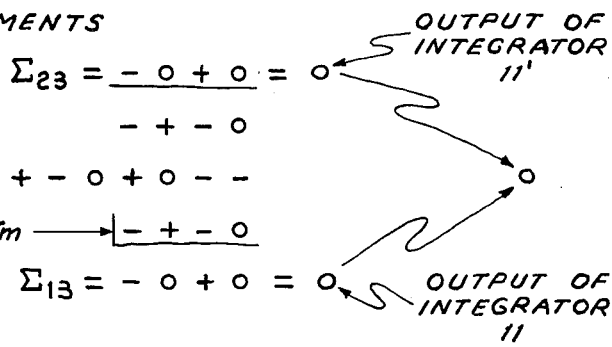
*d*    $Tm = 0$
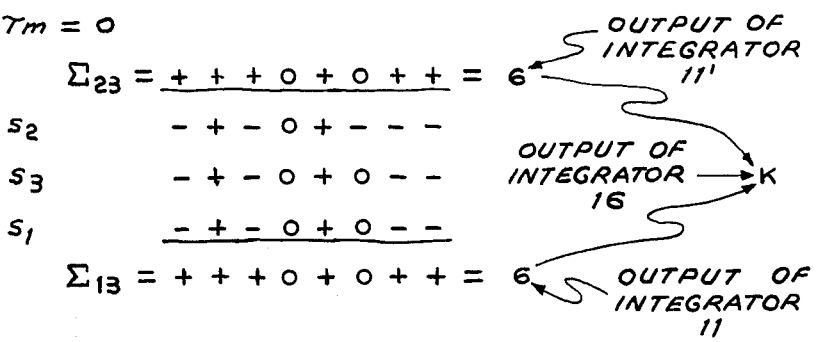
*e*    $Tm = -2$
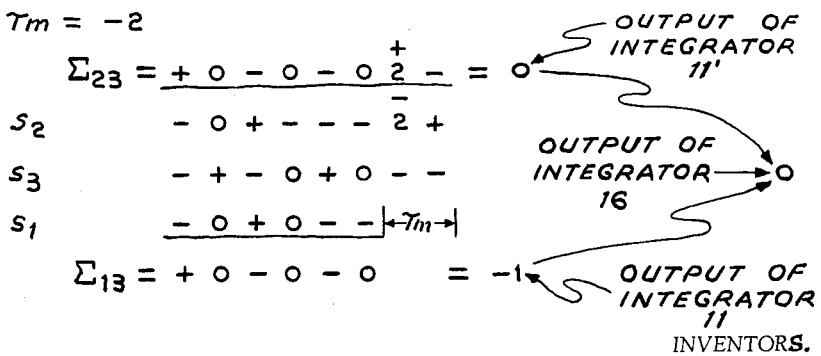
INVENTORS.
FRANK S. GUTLEBER
BY ROBERT S. BAILEY
AGENT

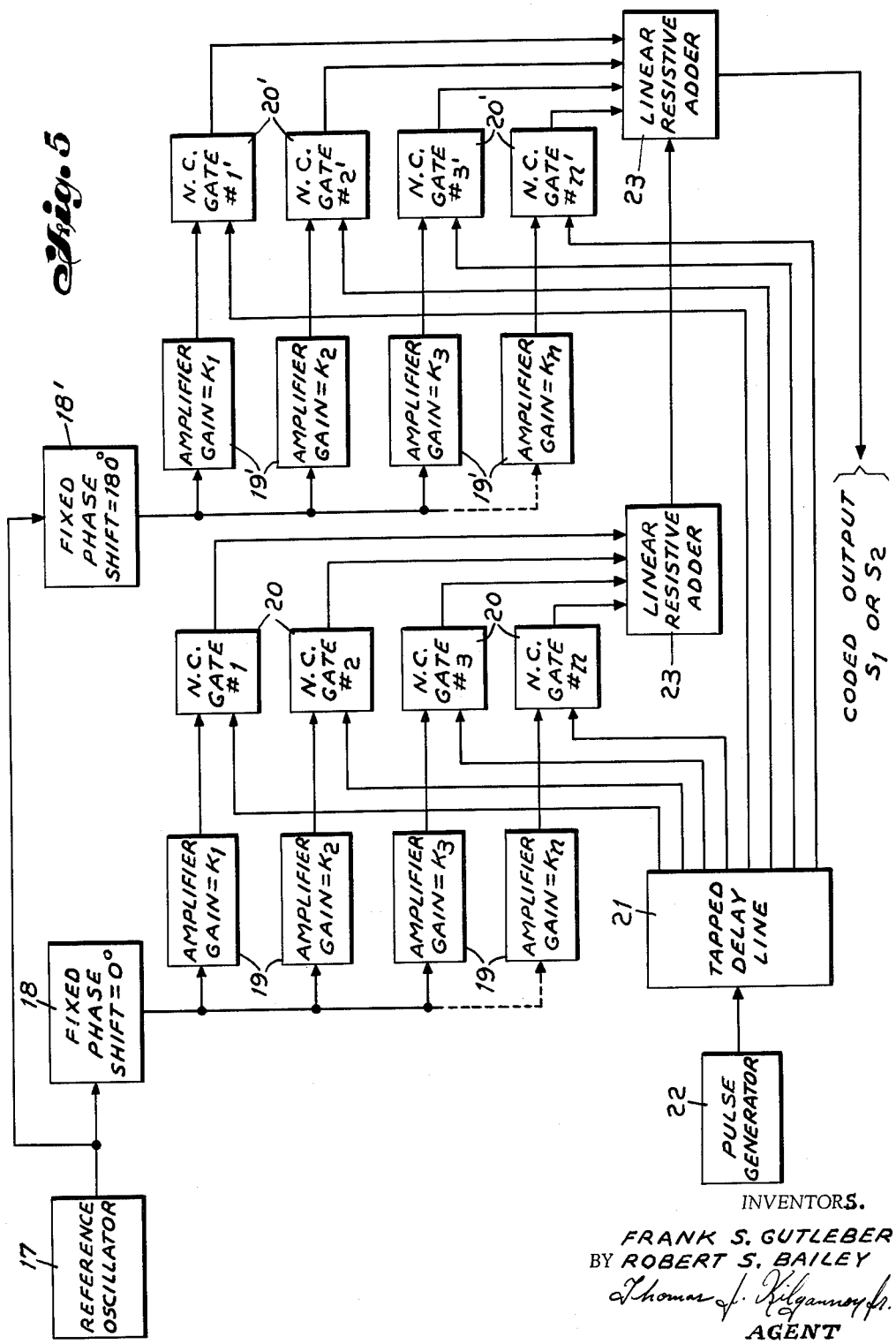

United States Patent Office 3,208,065
Patented Sept. 21, 1965

3,208,065
IMPULSE CORRELATION FUNCTION
GENERATOR
Frank S. Gutleber, Wayne, N.J., and Robert S. Bailey,
Concord, Mass., assignors to International Telephone
and Telegraph Corporation, Nutley, N.J., a corporation
of Maryland
Filed July 24, 1963, Ser. No. 297,291
26 Claims. (Cl. 343—17.1)

This invention relates to pulse signaling systems and more particularly to pulse signaling systems which utilize correlation techniques to provide an impulse function.

The term impulse function as used herein refers to a waveform, having no lobes, that is, a waveform having a single high peak indicative of a reflection from a distant target, completely free from spurious peaks of lower amplitude elsewhere in the waveform.

Correlation techniques have been widely utilized in the prior art in signal processing systems which utilize signals in the form of a pulse or sequence of pulses. Such techniques are most often utilized in radar systems to enhance the resolving power of the radar between closely spaced targets and, particularly when wide pulse widths are utilized to increase the average power transmitted by the radar. Usually, the reflected signal is processed by obtaining the product of code elements of the received signal and code elements of a locally generated waveform of the same waveform and period as the transmitted signal and integrating the resultant product. The ideal output from such a correlation would be a single peak of high amplitude which has a width substantially narrower than the pulse width of the transmitted pulse. Since this ideal waveform has been obtained only with great difficulty by special coding of the transmitted pulse, most systems in use today provide outputs having spurious peaks in addition to the desired high amplitude peak which indicates a target, for increase. The presence of the spurious peaks is undesirable in that the resolving power of the radar is affected with respect to targets which are relatively closely spaced.

It is, therefore, an object of this invention to provide a pulse signaling system which has increased resolving power.

Another object is to provide a pulse signaling system which utilizes correlation techniques to eliminate spurious peaks or lobes in an output waveform.

A further object is to provide correlation apparatus which is capable of providing an idealized output, i.e. a waveform having a single peak which is representative of a distant target.

Yet another object is to provide a system, which in combination with a given code, is more efficient than prior art systems for the same peak transmitted power.

A feature of this invention is the utilization of correlation means in conjunction with means for applying at least two coded pulses of different character to the correlation means to provide an output which is equal to zero except when the output results from the registration of one of the coded pulses with itself.

Another feature of this invention is the utilization of correlation apparatus in conjunction with means for applying at least two coded pulses of different character to the correlation apparatus to provide correlated outputs, at least one of which is equal to zero, except when the correlated outputs result from the registration of one of the coded pulses with itself.

Another feature is the utilization of means for correlating the outputs of the correlation apparatus to provide an output which is equal to zero except when the outputs of the correlation apparatus result from the registration of one of the coded pulses with itself.

A further feature of this invention is the utilization of pulse generators one of which generates a pulse having a coding of one character and another of which generates a pulse having a coding of different character. Transmitting and receiving means are provided to transmit one of the coded pulses and receive a reflection thereof. After reception, the reflected pulse is correlated with a delayed replica of the transmitted pulse and another correlation is carried out between the coded pulse of different character and the reflected pulse. The resulting outputs are then correlated to produce an output which is equal to zero except where coincidence of the reflected pulse and one of the generated pulses occurs.

The above-mentioned and other objects and features of this invention will become more apparent by reference to the following description taken in conjunction with the accompanying drawings, in which:

FIG. 1 is a schematic diagram, in block form, of a pulse signaling system which provides an impulse function in accordance with the invention;

FIG. 2 shows the coding of the pulses generated by the pulse generators of FIG. 1 and that of the received reflected coded pulse;

FIGS. 3a, 3b, 3c, 3d, and 3e show the relationship, at different delay times, between the elements of the received reflected coded pulse and the coded outputs of the pulse generators of FIG. 1. The multiplier outputs for each time interval are shown and the values of the integrator outputs of each correlator channel during the selected time interval are also shown;

FIGS. 4a, 4b, 4c, 4d, and 4e show a code which is more efficient than that shown in FIGS. 2 and 3. The relationship, at selected time intervals, between reflected code elements and the outputs of the pulse generators of FIG. 1, is also shown; and FIG. 5 is a block diagram of a pulse generator which is capable of generating coded pulses similar to those shown in FIG. 2.

Referring now to FIG. 1, there is shown a pulse signaling system 1 such as a pulse radar system; which incorporates a correlator shown generally at 2 within the dashed lines. A pulse generator 3 which generates a coded output pulse in response to a trigger pulse 4 from a pulse source (not shown) is coupled to a transmitter 5 which applies the coded pulse to antenna 6, from which the coded pulse is directively radiated. Trigger pulse 4 is simultaneously applied to a delay device 7 which may be a fixed or variable delay line if it is desired to introduce a delay between the initiation of a coded pulse from generator 3 and the initiation of a coded pulse from another pulse generator 8. In certain examples provided hereinafter, a fixed delay D' has been utilized, but such a delay is not necessary to achieve an impulse function in accordance with this invention as will be seen from another example. A second pulse generator 8, triggered by pulse 4, provides at its output a coded pulse which, as will be seen hereafter, is different in character from the coded pulse generator by pulse generator 3. The coded pulses from pulse generators 3 and 8 are applied to correlator 2 in addition to a reflected replica of the transmitted pulse from pulse generator 3. The reflected replica is received by antenna 6', shown separately from antenna 6 for convenience; is processed in a receiver 9, in a manner well known to those skilled in the art, and fed to correlator 2 for further processing.

Correlator 2 consists principally of two identical correlation channels made up of multipliers 10 and 10', respectively, and integrators 11 and 11', respectively. Multiplier 10 feeds integrator 11 and multiplier 10' feeds integrator 11'. Multipliers 10 and 10' are both fed simultaneously with the reflected replica of the transmitted coded pulse from receiver 9. Multipliers 10 and 10' are also supplied with coded pulses from pulse generators 3 and 8, respectively. The coded output pulse of pulse generator 3 will hereinafter be referred to as $S_1$; the coded output pulse of pulse generator 8 will be referred to as $S_2$, and the reflected replica of the transmitted output of generator 3 will be referred to as $S_3$. Thus, multiplier 10 is supplied with coded pulses $S_1$ and $S_3$, and multiplier 10' is supplied with coded pulses $S_2$ and $S_3$. To permit a comparison of the various elements of the coded pulses from one pulse to the next, a variable delay 12 introduces the same given delay on coded pulses $S_1$ and $S_2$. By varying the delays introduced, it is possible to obtain a registration of coded pulse $S_1$ with the reflected replica $S_3$. At this condition of registration, it is desired to have a maximum output, while for all other conditions of non-registration, a zero output is desired. Thus, if delay line 12 introduces various delays $\tau$, the condition of registration of $\tau=0$ will produce a maximum output, and for all other $\tau$'s, the output will be equal to zero.

FIG. 2 shows the coding of coded pulses $S_1$, $S_2$, and $S_3$. It should be obvious that the coding of pulses $S_1$ and $S_3$ is identical since $S_3$ is a reflected replica of the transmitted pulse $S_1$. $S_1$ is an arbitrary code, the code elements 13 of which are generated by pulse generator 3 of FIG. 1. $S_2$ is a code which causes one of the correlated outputs of integrators 11, 11' to be equal to zero except when there is coincidence between the corresponding elements 13 of the $S_1$ and $S_3$ pulses. Each element 13 is also representative of the incremental delay introduced on successive $S_1$ and $S_2$ pulses, so that, in effect, each of these pulses scans pulse $S_3$, element by element. An appropriate amount of delay is, of course, provided by delay line 12 which takes into account the maximum useful range of the radar. The code elements 13 are designated $+$, $-$, or 0. These symbols are, respectively, representative of signals which have a phase of 0°, 180° and an absence of any signal whatsoever. The appropriately phased signals or no signal at all are provided by pulse generators 3 and 8, an embodiment of which will be described hereinafter in connection with FIG. 5. The code elements 13 of $S_2$, in some instances in FIG. 2 have numerals such as $-_2$, $+_8$, $+_{80}$ which are different from the simple $+$, $-$, 0 arrangement of the $S_1$, $S_3$ pulses. The numerals refer to the amplitudes of the particular code elements 13. The amplitude differences in pulse $S_2$ result from the fact that once the value of a code element 13 has been determined for a given delay, it remains in the code for $S_2$. When the next incremental delay is introduced, the value for the preceding code element determines, along with the values of all the other code elements, what value must be ascribed to the present code element to cause, where necessary, the output of a correlator channel to be zero. The foregoing statement will become clearer in connection with the following discussion of FIG. 3.

FIG. 3a shows the relationship of the elements of coded pulses $S_1$, $S_2$ and $S_3$ when a time delay $\tau m=9$ elements has been introduced between the time of application of coded $S_1$ and $S_3$ to multiplier 10 and the time of application of coded pulses $S_2$ and $S_3$ to multiplier 10'. The delay $D_1$ was introduced between the initiation of coded pulses $S_1$ and $S_2$ because in determining the characteristics of the elements of coded pulse $S_2$, it was found that there was no necessity for starting code $S_2$ until 6 code elements were correlated since the correlation between coded pulses $S_1$ and $S_3$ over this period provided a zero output. As will be recalled, a zero output is the desired output except where coincidence of the corresponding elements of $S_1$ and $S_3$ is obtained. For another arbitrary coded pulse $S_1$, the delay $D_1$ might be greater or less and would have no effect on the general technique being taught by this invention.

Returning now to FIGS. 3a, the products of the individual code elements 13 of coded pulses $S_1$ and $S_3$ are shown following the symbol $\Sigma_{13}$. The products are obtained utilizing the usual algebraic method of multiplication. The summation of the products, using the algebraic method of addition, is shown having the value 6. This value is the output of integrator 11. Since the summation of the products has a value other than zero, another output must be provided which will give a value of zero when the outputs are again cross-correlated. The zero value is obtained by providing a coded pulse $S_2$ which forces the value of zero to occur. In FIG. 3a, the necessary portion of coded pulse $S_2$, the first five elements of coded pulse $S_2$ as shown in FIG. 2, is shown following the symbol $S_2$. The products of the individual code elements 13 of coded pulses $S_2$ and $S_3$ are shown following the symbol $\Sigma_{23}$. The summation of the products, indicated as the output of integrator 11', is shown to be zero. The outputs of integrators 11 and 11' are then applied, as shown in FIG. 1, to cross-correlator 14 which consists of a multiplier 15 and integrator 16. The output of integrator 16, in accordance with the teachings of this invention, should be zero for all values of $\tau m$, except $\tau m=0$. In FIG. 3a, the cross-correlated output of integrator 16 will be zero since one of the inputs equalled zero. It should be appreciated that for all values of $\tau m$ greater than 9, that the output of at least one of integrators 11 and 11' was equal to zero.

Referring now to FIG. 3b, the relationship of the coded pulses $S_1$, $S_2$ and $S_3$ is shown when the delay $\tau m$ is equal to four elements. By obtaining the products of the elements and summing as described in connection with FIG. 3a, it is seen that the summation $\Sigma_{13}$, the output of integrator 11, is equal to zero and the summation $\Sigma_{23}$, the output of integrator 11', has a value of eight (8). Comparison of the integrator outputs of FIG. 3a with the integrator outputs of FIG. 3b shows that in FIG. 3a, $\Sigma_{23}$ is equal to zero while in FIG. 3b, $\Sigma_{13}$ is equal to zero. When such a condition occurs, it is clear that there is no necessity to force an output to zero utilizing the pulsed code $S_2$. Thus, $S_2$ could have any value for the final code element when $\tau m=4$, but it is shown as $-3$ because such a value contributes to the simplification of the ultimately obtained code. In the instance of $\tau m=4$, the zero output occurred from the multiplication of the elements of pulsed code $S_1$ with the elements of the reflected pulsed code $S_3$. In the remaining examples it will be seen that an output results from the multiplication of the elements of $S_1$ and $S_3$ in accordance with the general trend when each delay position was tested. The fact that, at best, only one-quarter of the delay portions provided a zero output for an $S_1$, $S_3$ multiplication is an indication of the difficulty inherent in generating a code which will provide zero outputs for all delays except $\tau m=0$ when only a single cross-correlation channel is utilized.

In FIG. 3c, the condition of $\tau m=0$ is shown. Pulsed codes $S_1$ and $S_3$ are in coincidence, that is, the corresponding code elements 13 of each code are in registry. $\tau m=0$ is the condition where a maximum output is desired providing for an unambiguous detection of a target and high resolving power for closely spaced targets. This latter advantage is obtained, as has been mentioned previously, by eliminating spurious lobes which resulted from imperfect correlation. The output of the integrators 11 and 11' in FIG. 3c is a value other than zero and represents a high amplitude pulse K of much narrower width than the initially transmitted pulse.

FIGS. 3d and 3e show the element by element correlation of the coded pulses $S_1$, $S_2$ and $S_3$ when $\tau m$ is equal to $-3$ and $-12$ elements, respectively. The minus sign merely indicates that the multiplications and summations are being taken at a time after $\tau m=0$ has been tested. In FIGS. 3d and 3e, it is necessary to force a zero by utilizing the pulsed code $S_2$. The subsequent cross-correlation of the outputs of integrators 11, 11' in correlator 14 produces a zero output.

From the foregoing it is seen that a code can be generated which, in conjunction with the circuit of FIG. 1, will produce an impulse function, that is, a signal completely free from spurious lobes. The code $S_2$ generated by pulse generator 8 is, however, rather lengthy and the circuitry required for the generation of such a function is rather complicated. Such complex codes are not necessary as will be seen from the simpler and more efficient code to be described in connection with FIGS. 4a, b, c, d, and e.

FIG. 4a shows a coded pulse $S_1$ which is to be transmitted by and processed in the circuitry of FIG. 1. It should be noted that $S_1$ contains only eight code elements 13. FIG. 4b shows a coded pulse $S_2$, which when correlated with a reflected replica $S_3$ of transmitted pulse $S_1$ provides a maximum output at $\tau m=0$ and zero output for all other $\tau m$'s. The code $S_2$, in the same manner as shown in connection with FIG. 3, forces a zero output where the correlation of $S_1$ and $S_3$ does not provide a zero output. Codes such as shown in FIGS. 4a and 4b are inherently more efficient than the codes shown in FIG. 2 because of the closer match in the code structure between $S_2$ and $S_3$. Optimum detection occurs with an exact match which by itself, usually results in spurious lobes. With the proper mismatch between $S_2$ and $S_3$, the lobes are completely suppressed with some sacrifice in the detection efficiency. In the examples of FIG. 4 the resultant detection capability is 3 db poorer than the theoretical optimum. However, an output signal-to-noise ratio 4.8 db greater than that of a single pulse whose width was equal to one code digit length is obtained, while at the same time realizing a resolution capability equal to the single pulse case. Also, the resulting code structure was determined with comparative ease and the technique of this invention allows much more flexibility and simplicity in the choices for the basic code bit building blocks. It should also be mentioned that once a target position is established, the output of integrator 16 may be monitored providing an optimum output signal-to-noise ratio. In essence, the system provides optimum detection simultaneously with a separate high resolution output.

FIGS. 4c, 4d, 4e show the cross-correlation of coded pulses $S_1$, $S_2$ and $S_3$ at delay times of $\tau m=4, 0, -2$, respectively utilizing the higher efficiency coded pulses of FIGS. 4a and 4b. The cross-correlating takes place in the same manner as described in connection with FIG. 3. It should be noted in these examples that there is no delay D introduced between signals $S_1$ and $S_3$. Both of these signals are applied simultaneously to multipliers 10, 10' without affecting the desired result in any way.

Referring again to FIG. 1, pulse generators 3 and 8 supply the coded pulses $S_1$ and $S_2$. An arrangement for generating codes which can be used in accordance with this invention is shown in FIG. 5.

One possible method of implementing the codes is shown in FIGURE 5. A carrier from reference oscillator 17 is split into two phases of 0° and 180° in phase shifters 18, 18'. The phase shifted outputs are then fed through separate amplifiers 19 and 19' to normally closed gates 20 and 20' which are actuated at appropriate times from gate signals from tapped delay line 21 and pulse generator 22. All the outputs from gates 20 and 20' are then linearly summed in linear resistive adders 23 and 23' to provide a resultant coded signal $S_1$ or $S_2$ whose individual code bits may have an assigned amplitude level of from $K_1$ to $K_n$ and a code phase angle of either 0° or 180°. Zero code levels are provided by the absence of a gate signal during that code bit interval. The gating signals are obtained by means of a standard pulse generator which feeds a tapped delay line. Each output tap on the delay line is then applied to its appropriate normally closed (NC) gate in the composite coder, only one output appearing on one line during each code bit interval $\tau$.

Referring again to FIG. 1, multipliers 10, 10' and 15 may be any mixer or phase detector well known to those skilled in the art. For example, the multiplier or equivalently, the phase detector may be a subtractive diode type whose output is proportional to the cosine of the phase difference between two input signals. Integrators 11, 11' and 16 may be RC networks well known to those skilled in the art. In short, any circuit which will perform the functions described may be utilized without departing from the spirit of this invention.

While we have described above the principles of our invention in connection with specific apparatus, it is to be clearly understood that this description is made only by way of example and not as a limitation to the scope of our invention as set forth in the objects thereof and in the accompanying claims.

We claim:
1. An impulse correlation function generator comprising:
    first means to produce at least two sequences of coded pulses each having a different characteristic and a replica of a selected one of said sequences of coded pulses; and
    correlation means coupled to said first means responsive to said two sequences of coded pulses and said replica of said selected one of said sequences of coded pulses to produce an impulse output only at the time of coincidence of said selected one of said sequences of coded pulses and said replica of said selected one of said sequences of coded pulses and a zero output at all other times.

2. A generator according to claim 1, further including a delay means coupled between said first means and said correlation means to vary the time of arrival of said two sequences of coded pulses at said correlation means.

3. A generator according to claim 1, wherein said correlation means includes
    a first correlation channel responsive to said selected one of said sequences of coded pulses and said replica of said selected one of said sequences of coded pulses to provide therefrom a first correlated output,
    at least a second correlation channel responsive to the other of said sequences of coded pulses and said replica of said selected one of said sequences of coded pulses to provide therefrom a second correlated output,
    at least one of said first and second correlated outputs being equal to zero at said all other times and both of said first and second correlated outputs being an impulse output at said time of coincidence, and
    second means coupled to said first and second correlation channels for correlating said first and second correlated outputs to produce an impulse output at said time of coincidence and a zero output at said all other times.

4. A generator according to claim 3, wherein said correlation means further includes
    a delay means coupled to an input of said first and second correlation channels and said first means to vary the time of arrival of said two sequences of coded pulses at said input of said first and second correlation channels.

5. A generator according to claim 3, wherein said first correlation channel, said second correlation channel and said second means each include a multiplier and an integrator coupled in series relationship to said multiplier.

6. A generator according to claim 5, wherein said correlation means further includes
    a delay means coupled to an input of said multiplier of both said first and second correlation channels and said first means to vary the time of arrival of said two sequences of coded pulses at the input of said multiplier of both said first and second correlation channels.

7. An impulse correlation function generator comprising:
    first means to produce at least two sequences of coded pulses each having a different characteristic;

second means coupled to said first means responsive to a selected one of said sequences of coded pulses to produce a replica of said selected one of said sequences of coded pulses;

correlation means coupled to said second means; and third means coupled between said first means and said correlation means to couple said two sequences of coded pulses to said correlation means to produce an impulse output only at the time of coincidence of said selected one of said sequences of coded pulses and said replica of said selected one of said coded pulses and a zero output at all other times.

8. A generator according to claim 7, wherein said third means includes a delay means to vary the time of arrival of said two sequences of coded pulses at said correlation means.

9. A generator according to claim 7, wherein said correlation means includes a first correlation channel responsive to said selected one of said sequences of coded pulses and said replica of said selected one of said sequences of coded pulses to provide therefrom a first correlated output, at least a second correlation channel responsive to the other of said sequences of coded pulses and said replica of said selected one of said sequences of coded pulses to provide therefrom a second correlated output, at least one of said first and second correlated outputs being equal to zero at said all other times and both of said first and second correlated outputs being an impulse output at said time of coincidence, and fourth means coupled to said first and second correlation channels for correlating said first and second correlated outputs to produce an impulse output at said time of coincidence and a zero output at said all other times.

10. A generator according to claim 9, wherein said first correlation channel, said second correlation channel and said fourth means each include a multiplier and an integrator coupled in series relationship to said multiplier.

11. A generator according to claim 10, wherein said third means includes a delay means coupled to an input of said multiplier of both said first and second correlation channels to vary the time of arrival of said two sequences of coded pulses at said input of said multiplier of both said first and second correlation channels.

12. A generator according to claim 7, wherein said correlation means includes a first multiplier coupled to said first means and said second means to multiply said selected one of said sequences of coded pulses and said replica of said selected one of said sequences of coded pulses, a first integrator coupled to said first multiplier to produce a first correlated output, a second multiplier coupled to said first means and said second means to multiply the other of said sequences of coded pulses and said replica of said selected one of said sequences of coded pulses, a second integrator coupled to said second multiplier to produce a second correlated output, at least one of said first and second correlated outputs being equal to zero at said all other times and both of said first and second correlated outputs being an impulse output at said time of coincidence, a third multiplier coupled to said first and second integrators to multiply said first and second correlated outputs, and a third integrator coupled to said third multiplier to produce an impulse output at said time of coincidence and a zero output at said all other times.

13. An impulse correlation function generator comprising:

first means to generate a first sequence of coded pulses having a given characteristic;

a second means for generating a second sequence of coded pulses having a characteristic different than said given characteristic;

third means coupled to one of said first and second means to provide a replica of one of said first and second sequences of coded pulses;

correlation means coupled to said first means; and fourth means coupled between said first and second means and said correlation means to couple said first and second sequences of coded pulses to said correlation means to produce an impulse output only at the time of coincidence of said one of said sequences of coded pulses and said replica of said one of said sequences of coded pulses and a zero output at all other times.

14. A generator according to claim 13, wherein said fourth means includes a delay means to vary the time of arrival of said first and second sequences of coded pulses at said correlation means.

15. A generator according to claim 13, wherein said correlation means includes a first correlation channel coupled to said first means and said third means to provide a first correlated output, a second correlation channel coupled to said second means and said third means to provide a second correlated output, at least one of said first and second correlated outputs being equal to zero at said all other times and both of said first and second correlated outputs being an impulse output at said time of coincidence, and fifth means coupled to said first and second correlation channels for correlating said first and second correlated outputs to produce an impulse output at said time of coincidence and a zero output at said all other times.

16. A generator according to claim 15, wherein said fourth means includes a delay means coupled to said first and second means and the inputs of said first and second correlation channels to vary the time of arrival of said first and second sequences of coded pulses at the inputs of said first and second correlation channels.

17. A generator according to claim 13, wherein said correlation means includes a first multiplier coupled to said first means and said third means to multiply said first sequence of coded pulses and said replica of said one of said first and second sequences of coded pulses, a first integrator coupled to said first multiplier to produce a first correlated output, a second multiplier coupled to said second means and said third means to multiply said second sequence of coded pulses and said replica of said one of said first and second sequences of coded pulses, a second integrator coupled to said second multiplier to produce a second correlated output, at least one of said first and second correlated outputs being equal to zero at said all other times and both of said first and second correlated outputs being an impulse output at said time of coincidence, a third multiplier coupled to said first and second integrators to multiply said first and second correlated outputs, and a third integrator coupled to said third multiplier to produce an impulse output at said time of coincidence and a zero output at said all other times.

18. A generator according to claim 17, wherein said fourth means includes a delay means coupled to said first and second means and an input of said first and second multipliers to vary the time of arrival of said first and second sequences of coded pulses at said input of said first and second multipliers.

19. An impulse correlation function generator comprising:
first means for generating a first sequence of coded pulses having a given characteristic;
second means coupled to said first means for radiantly transmitting said first sequence of coded pulses;
third means for receiving reflections of said first sequence of coded pulses;
fourth means coupled to said first means and said third means for correlating said first sequence of coded pulses and said reflection of said first sequence of coded pulses to produce a first output voltage including zero;
fifth means for generating a second sequence of coded pulses having a characteristic different than said given characteristic;
sixth means coupled to said fifth means and said third means for correlating said reflection of said first sequence of coded pulses and said second sequence of coded pulses to produce a second output voltage including zero; and
seventh means coupled to said fourth means and said sixth means for correlating said first and second output voltages to produce an impulse output only at the time of coincidence of said first sequence of coded pulses and said reflections of said first sequence of said coded pulses and a zero output at all other times.

20. A generator according to claim 19, wherein said fourth means includes
a multiplier coupled to said first means and said third means, and
an integrator coupled to the output of said multiplier.

21. A generator according to claim 20, further including
a delay means coupled to said first means to vary the time of arrival of said first sequence of coded pulses at said multiplier.

22. A generator according to claim 19, wherein said sixth means includes
a multiplier coupled to said fifth means and said third means, and
an integrator coupled to the output of said multiplier.

23. A generator according to claim 22, further including
a delay means coupled to said fifth means to vary the time of arrival of said second sequence of coded pulses at said multiplier.

24. A generator according to claim 19, wherein said seventh means includes
a multiplier coupled to said fourth means and said sixth means, and
an integrator coupled to the output of said multiplier.

25. A generator according to claim 19, wherein said fourth means includes
a first multiplier coupled to said first means and said third means, and
a first integrator coupled to the output of said first multiplier;
said sixth means includes a second multiplier coupled to said fifth means and said third means, and
a second integrator coupled to the output of said second multiplier; and
said seventh means includes a third multiplier coupled to said first and second integrators, and
a third integrator coupled to the output of said third multiplier.

26. A generator according to claim 25, further including
a delay means coupled to said first means and said fifth means to vary the time of arrival of said first sequence of coded pulses and said second sequence of coded pulses at said first multiplier and said second multiplier, respectively.

No references cited.

CHESTER L. JUSTUS, *Primary Examiner.*